United States Patent
Xie

(10) Patent No.: US 10,640,389 B2
(45) Date of Patent: May 5, 2020

(54) **ALUMINUM-RICH *MRE FRAMEWORK TYPE MOLECULAR SIEVES**

(71) Applicant: Chevron U.S.A. Inc., San Ramon, CA (US)

(72) Inventor: Dan Xie, Richmond, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 16/439,031

(22) Filed: Jun. 12, 2019

(65) Prior Publication Data

US 2019/0382275 A1 Dec. 19, 2019

Related U.S. Application Data

(60) Provisional application No. 62/685,010, filed on Jun. 14, 2018.

(51) Int. Cl.
*C01B 39/48* (2006.01)
*B01J 29/70* (2006.01)

(52) U.S. Cl.
CPC ............ *C01B 39/48* (2013.01); *B01J 29/703* (2013.01); *B01J 2229/20* (2013.01); *C01P 2002/72* (2013.01); *C01P 2004/03* (2013.01); *C01P 2004/45* (2013.01)

(58) Field of Classification Search
CPC .. C01B 39/48; B01J 20/18; B01J 29/70; B01J 29/703; C01P 2004/03; C01P 2004/45
See application file for complete search history.

(56) References Cited

U.S. PATENT DOCUMENTS

| | | | |
|---|---|---|---|
| 4,397,827 A | 8/1983 | Chu | |
| 5,075,269 A | 12/1991 | Degnan et al. | |
| 5,098,685 A | 3/1992 | Casci et al. | |
| 6,923,949 B1 * | 8/2005 | Lai | C01B 39/48 423/709 |
| 7,482,300 B2 | 1/2009 | Lai et al. | |
| 7,771,703 B2 | 8/2010 | Guillon et al. | |
| 9,802,830 B2 | 10/2017 | Ojo et al. | |
| 2009/0076317 A1 | 3/2009 | Lai et al. | |
| 2015/0114882 A1 | 4/2015 | Nagayasu et al. | |
| 2017/0056868 A1 * | 3/2017 | Ojo | B01J 29/7446 |
| 2017/0056869 A1 | 3/2017 | Ojo et al. | |

FOREIGN PATENT DOCUMENTS

| | | |
|---|---|---|
| EP | 0046504 | 3/1982 |
| EP | 0142317 | 5/1985 |

OTHER PUBLICATIONS

A. Araya and B.M. Lowe "Zeolite Synthesis in the NH2(CH2)6NH2—Al2O3—SiO2—H2O System at 180oC" 1984, J. Catal. 2002, 85, 135-142.

R.F. Lobo and H. Van Koningsveld "New Description of the Disorder in Zeolite ZSM-48" J. Am. Chem. Soc. 2002, 124, 13222-13230.

(Continued)

*Primary Examiner* — David M Brunsman

(57) ABSTRACT

A method is provided for synthesizing aluminum-rich molecular sieves of *MRE framework type via interzeolite transformation of a FAU framework type zeolite in the presence of hexamethonium cations.

9 Claims, 2 Drawing Sheets

(56) References Cited

OTHER PUBLICATIONS

C.E. Kirschhock, D. Liang, G. Van Tendeloo, A. Fecant, G. Hastoye, G. Vanbutsele, N. Bats, E. Guillon and J.A. Martens "Ordered End-Member of ZSM-48 Zeolite Family" Chem. Mater. 2009, 21, 371-380.

T. Wilhammar and X. Zou "Stacking disorders in zeolites and open-frameworks—structure elucidation and analysis by electron crystallography and X-ray diffraction" Z. Krystallogr. 2014, 228, 11-27.

PCT International Search Report, International Patent Appl. No. PCT/IB19/054889, dated Oct. 31, 2019.

* cited by examiner

ALUMINUM-RICH *MRE FRAMEWORK TYPE MOLECULAR SIEVES

CROSS-REFERENCE TO RELATED APPLICATIONS

This application claims priority to and the benefit of U.S. Provisional Application Ser. No. 62/685,010, filed Jun. 14, 2018.

FIELD

This disclosure relates to aluminum-rich molecular sieves of *MRE framework type, their synthesis and their use in catalytic processes.

BACKGROUND

Zeolitic materials, both natural and synthetic, have been demonstrated in the past to be useful as sorbent materials and to have catalytic properties for various types of hydrocarbon conversion reactions. Certain zeolitic materials are ordered, porous crystalline metallosilicates having a definite crystalline structure as determined by X-ray diffraction (XRD). Within the zeolitic material there are a large number of smaller cavities which may be interconnected by a number of still smaller channels or pores. These cavities and pores are uniform in size within a specific zeolitic material. Because the dimensions of these pores are such as to accept for sorption molecules of certain dimensions while rejecting those of larger dimensions, these materials have come to be known as "molecular sieves" and are utilized in a variety of industrial processes.

One type of zeolite structure used for catalytic processing of petroleum streams is ZSM-48, a disordered high-silica zeolite with a one-dimensional 10-ring pore system. U.S. Pat. No. 4,397,827 discloses ZSM-48 and its preparation using a mixture of a $C_2$-$C_{12}$ alkylamine and a tetramethylammonium compound. The framework structure of ZSM-48 has been assigned the three-letter code *MRE by the Structure Commission of the International Zeolite According to R. F. Lobo et al. (*J. Am. Chem. Soc.* 2002, 124, 13222-13230), ZSM-48 is not a code for one material but for a family of materials with different degrees of disorder. T. Wilhammar et al. (*Z. Krystallogr.* 2013, 228, 11-27) report that other materials of *MRE framework type include COK-8 (described in *Chem. Mater.* 2009, 21, 371-380), EU-2 (described in U.S. Pat. No. 5,098,685), EU-11 (described in *J. Catal.* 1984, 85, 135-142), IZM-1 (described in U.S. Pat. No. 7,771,703), and ZBM-30 (described in European Patent Application No. 0046504). U.S. Pat. No. 9,802,830 discloses molecular sieve SSZ-91, a molecular sieve belonging to the ZSM-48 family of zeolites.

A number of organic compounds have been shown to direct the synthesis of *MRE framework type molecular sieves including organic linear amine and polyamine compounds, diquaternary alkyl ammonium compounds and glycols.

U.S. Pat. Nos. 5,075,269 and 7,482,300 disclose the synthesis of ZSM-48 using conventional sources of silica and alumina in the presence of a hexamethonium salt directing agent. ZSM-48 prepared according to U.S. Pat. No. 5,075,269 is reported to have a $SiO_2/Al_2O_3$ molar ratio of at least 100. The synthesis Example produced a zeolite having a $SiO_2/Al_2O_3$ molar ratio of 170. ZSM-48 prepared according to U.S. Pat. No. 7,482,300 is said to have a $SiO_2/Al_2O_3$ molar ratio of less than 110, but the lowest $SiO_2/Al_2O_3$ molar ratio reported in the Examples is ~80.

Zeolites are kinetically (but not thermodynamically) stable towards conversion to denser framework structures (e.g., α-quartz). As a result, their synthesis often involves the formation of structures of intermediate stability in the course of forming the ultimate target structures, which are often rendered stable only by the use of specific organic or inorganic cations. Recently, transformations of one zeolite structure into another one—interzeolite transformations—have been explored because they can provide a strategy for the selective synthesis of specific structures, often with shorter synthesis times. The mechanistic details of such interzeolite transformations, however, remain unclear and predictions of their success largely empirical.

According to the present disclosure, it has now been found that interzeolite conversion of an aluminosilicate zeolite of FAU framework type in the presence of hexamethonium cations is effective in the production of *MRE framework type molecular sieves at higher aluminum concentrations than those previously exemplified.

SUMMARY

In one aspect, there is provided a method of synthesizing a molecular sieve of *MRE framework type, the method comprising: (a) providing a reaction mixture comprising: (1) a zeolite of FAU framework type; (2) a source of a Group 1 or Group 2 metal (M); (3) a structure directing agent (Q) comprising hexamethonium cations; (4) a source of hydroxide ions; and (5) water; and (b) subjecting the reaction mixture to crystallization conditions sufficient to convert the zeolite of FAU framework type to a molecular sieve of *MRE framework type.

In another aspect, there is provided a molecular sieve of *MRE framework type having a molar of $SiO_2/Al_2O_3$ of less than 70, and in its as-synthesized form, comprising hexamethonium cations in its pores.

In a further aspect, there is provided a process for dewaxing a paraffin-containing feedstock which comprises contacting the paraffin-containing feedstock at dewaxing conditions with a catalyst comprising an active form of the molecular sieve disclosed herein.

DETAILED DESCRIPTION

Introduction

Figure 1:
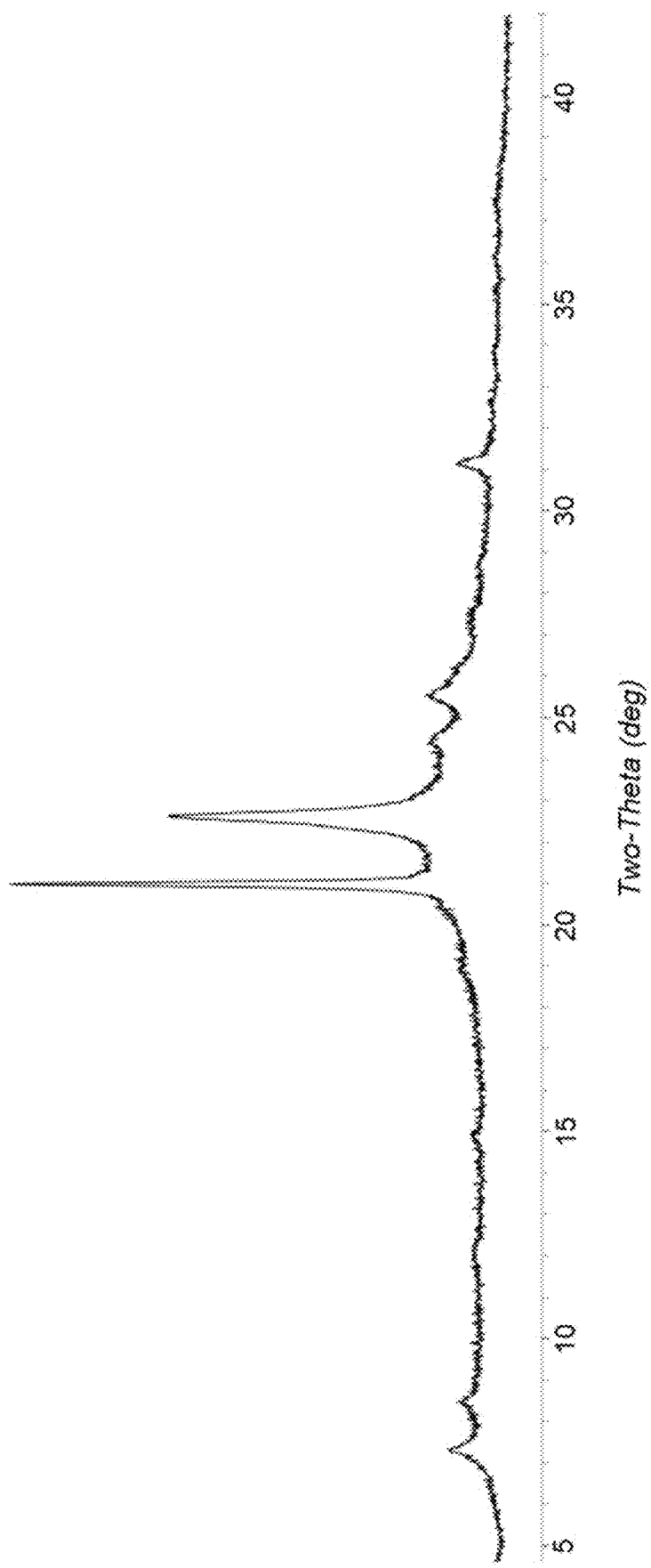
FIG. 1 is a powder X-ray diffraction (XRD) pattern of the as-synthesized molecular sieve prepared in Example 1.

The term "zeolite" generally refers to a microporous crystalline material which exhibits a network of $SiO_4$ and $AlO_4$ tetrahedra in which aluminum and silicon atoms are crosslinked in a three-dimensional framework by sharing oxygen atoms.

The term "molecular sieve" is used synonymously with the term "zeolite" or "microporous crystalline material."

The term "framework type" is used in the sense described in the "*Atlas of Zeolite Framework Types*," Sixth Revised Edition, Elsevier, 2007.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a molecular sieve of *MRE framework type may be synthesized by: (a) providing a reaction mixture comprising (1) a zeolite of FAU framework type; (2) a source of a Group 1 or Group 2 metal (M); (3) a structure directing agent (Q) comprising hexamethonium cations; (4) a source of hydroxide ions; and (5) water; and (b) subjecting the reaction mixture to crystallization conditions sufficient to convert the zeolite of FAU framework type to a molecular sieve of *MRE framework type.

The reaction mixture can have a composition, in terms of molar ratios, within the ranges identified in Table 1:

TABLE 1

| Reactants | Useful | Exemplary |
|---|---|---|
| $SiO_2/Al_2O_3$ | 30 to 100 | 60 to 80 |
| $M/SiO_2$ | 0.05 to 0.50 | 0.05 to 0.20 |
| $Q/SiO_2$ | 0.01 to 0.20 | 0.01 to 0.10 |
| $OH/SiO_2$ | 0.10 to 0.30 | 0.12 to 0.20 |
| $H_2O/SiO_2$ | 10 to 60 | 15 to 40 | wherein compositional variables M and Q are as described herein above.

The zeolite of FAU framework type can be a Y zeolite. The zeolite can have a $SiO_2/Al_2O_3$ molar ratio in a range of 5 to 100 (e.g., 12 to 100, 12 to 80, 30 to 100, 30 to 80, 60 to 100, or 60 to 80).

The zeolite of FAU framework type can comprise two or more zeolites. The two or more zeolites can be Y zeolites having different silica-to-alumina molar ratios.

The reaction mixture can be essentially free of a non-zeolitic source of silicon oxide. Examples of non-zeolitic sources of silicon oxide include colloidal silica, fumed silica, precipitated silicas, alkali metal silicates, and tetraalkyl orthosilicates. Additionally or alternatively, reaction mixture can be essentially free of a non-zeolitic source of aluminum oxide. Examples of non-zeolitic sources of aluminum oxide include hydrated alumina, aluminum hydroxide, alkali metal aluminates, aluminum alkoxides, and water-soluble aluminum salts (e.g., aluminum nitrate). The term "essentially free of", as in "essentially free of a non-zeolitic source of silicon oxide and/or aluminum oxide" refers to the condition where the composition to which this term refers is absent any such deliberately added materials but may include these species as adventitious impurities. When the term "essentially free of" is used, additional alternative embodiments include those where the species to which the term refers may be present at less than 0.1 wt. % (e.g., less than 0.05 wt. %, less than 0.025 wt. %, less than 0.01 wt. %, or 0 wt. %).

Suitable Group 1 or Group 2 metals include sodium, potassium and calcium, with potassium being preferred. The metal is generally present in the reaction mixture as the hydroxide.

The structure directing agent (Q) comprises hexamethonium cations, represented by the following structure (1):

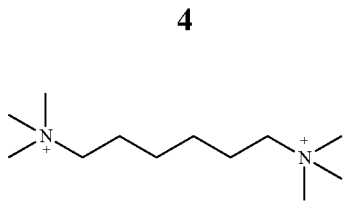

(1)

Suitable sources of Q are the hydroxides and/or other salts of the diquaternary ammonium compound.

The reaction mixture may also contain seeds of a molecular sieve material, such as ZSM-48, desirably in an amount of from 0.01 to 10,000 ppm by weight (e.g., from 100 to 5000 ppm by weight) of the reaction mixture.

For each embodiment described herein, reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 72 to 600 hours. Crystallization is usually carried out in an autoclave so that the reaction mixture is subject to autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The as-synthesized molecular sieve may be subjected to subsequent treatment to remove part or all of the structure directing agent (Q) used in its synthesis. This can be conveniently effected by thermal treatment in which the as-synthesized material can be heated at a temperature of at least about 370° C. for at least 1 minute and generally not longer than about 24 hours. The thermal treatment can be performed at a temperature up to about 925° C. While sub-atmospheric and/or super-atmospheric pressures can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22). The organic-depleted product, especially in its metal, hydrogen, and/or ammonium forms, can be particularly useful in the catalysis of certain organic (e.g., hydrocarbon) conversion reactions. In the present disclosure, the organic-depleted molecular sieve in its hydrogen form is referred to as "active form" of the molecular sieve, with or without metal function present.

To the extent desired, any Group 1 or 2 metal cations (e.g., $K^+$) in the as-synthesized molecular sieve can be replaced in accordance with techniques well known in the art by ion exchange with other cations. Replacing cations can include metal ions, hydrogen ions, hydrogen precursor ions (e.g., ammonium ions), and combinations thereof. Particularly preferred replacing cations include those with which the catalytic activity can be specifically tailored for certain hydrocarbon conversion reactions. These can include hydrogen, rare earth metals, and metals of Groups 2 to 15 of the Periodic Table of the Elements.

The present *MRE framework type molecular sieve may be intimately combined with a hydrogenating component. Metal hydrogenation components may be from Groups 6-12 of the Periodic Table (e.g., Groups 6 and 8-10). Examples of such metals include molybdenum (Mo), tungsten (W), manganese (Mn), nickel (Ni), cobalt (Co), copper (Cu), zinc (Zn), ruthenium (Ru), palladium (Pd) and platinum (Pt), especially palladium or platinum. Mixtures of hydrogenation metals may also be used such as Co/Mo, Ni/Mo, Ni/W and Pt/Pd, especially Pt/Pd. The amount of hydrogenation metal or metals may range from 0.1 to 5 wt. %, based on catalyst. Methods of loading metal onto a catalyst are well known and include, for example, impregnation of a catalyst with a metal salt of the hydrogenation component and heating.

Characterization of the Molecular Sieve

In its as-synthesized and anhydrous form, the present molecular sieve can have a chemical composition comprising the following molar relationship as described in Table 2:

TABLE 2

|  | Broad | Exemplary |
| --- | --- | --- |
| $SiO_2/X_2O_3$ | 30 to 80 | 50 to 70 |
| $Q/SiO_2$ | >0 to 0.1 | >0 to 0.1 |
| $M/SiO_2$ | >0 to 0.1 | >0 to 0.1 | wherein compositional variables Q and M are as described herein above.

The as-synthesized *MRE framework type molecular sieve can have a $SiO_2/Al_2O_3$ molar ratio in a range of 30 to 80 (e.g., 35 to 80, 40 to 80, 45 to 80, 50 to 80, 55 to 80, 30 to 70, 35 to 70, 40 to 70, 45 to 70, 50 to 70, 55 to 70, 30 to <70, 35 to <70, 40 to <70, 45 to <70, 50 to <70, 55 to <70, 35 to 65, 40 to 65, 45 to 65, 50 to 65, or 55 to 65).

The *MRE framework type molecular sieve can comprise at least one of COK-8, EU-2, EU-11, IZM-1, SSZ-91, ZBM-30, and ZSM-48.

The present *MRE framework type molecular sieve may be substantially free of non-*MRE materials. The term "substantially free of non-*MRE materials" used herein means that the present molecular sieve contains 3.5 wt. % or less (e.g., 0 to 3.5 wt. %, 2 wt. % or less, 1 wt. % or less, or no detectable amount by XRD) of such impurities, which weight percent (wt. %) values are based on the combined weight of impurities and pure phase *MRE materials. Examples of non-*MRE materials include amorphous material, kenyaite, magadiite, EU-1, FAU, and ZSM-50.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

The molecular sieve prepared by the method disclosed herein may be used as a sorbent or as a catalyst to catalyze a wide variety of organic compound (e.g., hydrocarbon) conversion processes including many of present commercial/industrial importance.

As is the case of many catalysts used in organic compound conversion processes, it may be desirable to incorporate the present *MRE framework type molecular sieve with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides.

Use of a material in conjunction with the present *MRE framework type molecular sieve (i.e., combined therewith or present during synthesis of the new crystal) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions.

Naturally occurring clays which may be composited with the present *MRE framework type molecular sieve can include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions (e.g., mechanical attrition) which occur in various hydrocarbon conversion processes. Thus, the molecular sieves manufactured by the method of the present disclosure may be used in the form of an extrudate with a binder. They are typically bound by forming a pill, sphere, or extrudate. The extrudate is usually formed by extruding the molecular sieve, optionally in the presence of a binder, and drying and calcining the resulting extrudate.

Alternatively or in addition to the foregoing materials, the present *MRE framework type molecular sieve can be composited with a porous matrix material such as silica-alumina, silica-magnesia, silica-zirconia, silica-thoria, silica-beryllia, silica-titania and/or one or more ternary compositions such as silica-alumina-thoria, silica-alumina-zirconia, silica-alumina-magnesia and silica-magnesia-zirconia.

The relative proportions of the present *MRE framework type molecular sieve and inorganic oxide matrix may vary widely, with the *MRE framework type molecular sieve content ranging from 1 to 90 wt. % (e.g., 2 to 80 wt. %) of the composite.

The present *MRE framework type molecular sieve may be useful as a catalyst in organic compound conversion reactions where high activity is important. For example, when combined with a hydrogenation component (e.g., Pt Pd), the present *MRE framework type molecular sieve may be useful as a catalyst in the dewaxing of paraffinic hydrocarbon feedstocks.

A suitable feedstock is a lube oil basestock. Such feedstocks are wax-containing feeds that boil in the lubricating oil range, typically having a 10% distillation point greater than 650° F. (343° C.), as measured by ASTM D86 or ASTM D2887, and are derived from mineral or synthetic sources. The feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Dewaxing conditions can include a temperature of up to 426° C. (e.g., from 250° C. to 400° C., or from 275° C. to 350° C.); a pressure of from 791 kPa to 20.79 MPa (100 to 3000 psig), such as 1480 kPa to 17.34 MPa (200 to 2500 psig); a liquid hourly space velocity of from 0.1 to 10 h$^{-1}$ (e.g., 0.1 to 5 h$^{-1}$); and a hydrogen treat gas rate of from 45 to 1780 m$^3$/m$^3$ (250 to 10000 scf/B), such as 89 to 890 m$^3$/m$^3$ (500 to 5000 scf/B).

EXAMPLES

The following illustrative examples are intended to be non-limiting.

Example 1

3.19 g of deionized water, 0.10 g of a 45% KOH solution, 0.48 g of a 20% hexamethonium hydroxide solution and 0.50 g of CBV780 Y-zeolite (Zeolyst International, SiO$_2$/Al$_2$O$_3$ molar ratio=80) were mixed together in a Teflon liner. The resulting gel was stirred until it became homogeneous. The liner was then capped and placed within a Parr Steel autoclave reactor. The autoclave was then put in an oven heated at 160° C. for 6 days under static conditions. The solid products were recovered from the cooled reactor by centrifugation, washed with deionized water and dried at 95° C.

Figure 2:
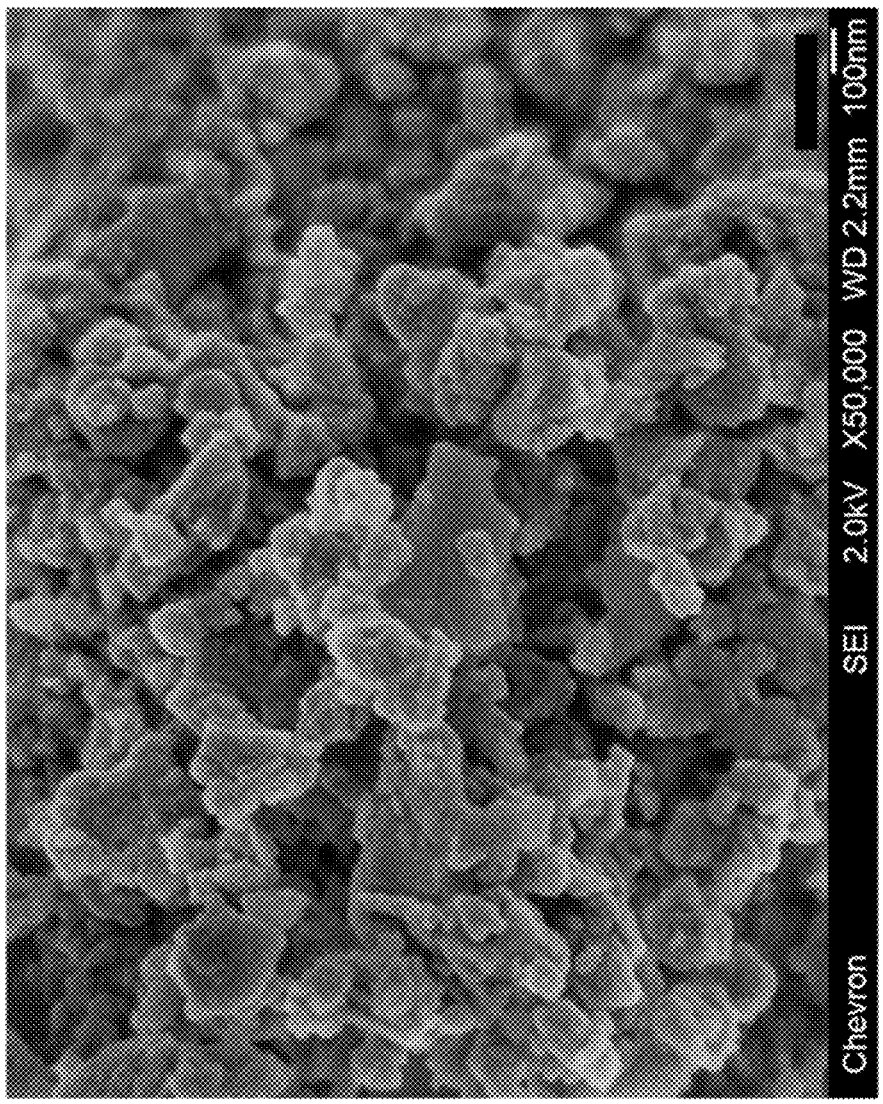
FIG. 2 is a Scanning Electron Micrograph (SEM) image of the as-synthesized molecular sieve prepared in Example 1.

The resulting product was analyzed by powder XRD and SEM. The powder XRD pattern of the as-synthesized product is shown FIG. 1 and is consistent with the product being a pure *MRE framework type molecular sieve. A SEM image of the product is shown in FIG. 2 and indicates a uniform field of crystals.

The product had a SiO$_2$/Al$_2$O$_3$ mole ratio of 64.1, as determined by Inductively Coupled Plasma (ICP) elemental analysis.

Example 2

13.68 g of deionized water, 0.40 g of a 45% KOH solution, 0.76 g of a 20% hexamethonium hydroxide solution and 2.00 g of CBV760 Y-zeolite (Zeolyst International, SiO$_2$/Al$_2$O$_3$ molar ratio=60) were mixed together in a Teflon liner. The gel was stirred until it became homogeneous. The liner was then capped and placed within a Parr Steel autoclave reactor. The autoclave was then put in an oven heated at 170° C. for 6 days under static conditions. The solid products were recovered from the cooled reactor by centrifugation, washed with deionized water and dried at 95° C.

The resulting zeolite product was identified by powder XRD and SEM as a pure *MRE type framework molecular sieve.

The product had a SiO$_2$/Al$_2$O$_3$ molar ratio of 59.2, as determined by ICP elemental analysis.

Example 3

20.06 g of deionized water, 0.60 g of a 45% KOH solution, 1.71 g of a 20% hexamethonium hydroxide solution and 3.00 g of CBV760 Y-zeolite (Zeolyst International, SiO$_2$/Al$_2$O$_3$ molar ratio=60) were mixed together in a Teflon liner. The gel was stirred until it became homogeneous. The liner was then capped and placed within a Parr Steel autoclave reactor. The autoclave was then put in an oven heated at 170° C. for 6 days under static conditions. The solid products were recovered from the cooled reactor by centrifugation, washed with deionized water and dried at 95° C.

The resulting zeolite product was identified by powder XRD and SEM as a mixture of *MRE type framework molecular sieve and trace amount of EUO type framework molecular sieve.

Example 4

19.15 g of deionized water, 0.60 g of a 45% KOH solution, 2.86 g of a 20% hexamethonium hydroxide solution and 3.00 g of CBV760 Y-zeolite (Zeolyst International, SiO$_2$/Al$_2$O$_3$ molar ratio=60) were mixed together in a Teflon liner. The gel was stirred until it became homogeneous. The liner was then capped and placed within a Parr Steel autoclave reactor. The autoclave was then put in an oven heated at 170° C. for 6 days under static conditions. The solid products were recovered from the cooled reactor by centrifugation, washed with deionized water and dried at 95° C.

The resulting zeolite product was identified by powder XRD and SEM as a mixture of *MRE type framework molecular sieve and EUO type framework molecular sieve.

Example 5

20.98 g of deionized water, 0.60 g of a 45% KOH solution, 0.57 g of a 20% hexamethonium hydroxide solution and 3.00 g of CBV760 Y-zeolite (Zeolyst International, SiO$_2$/Al$_2$O$_3$ molar ratio=60) were mixed together in a Teflon liner. The gel was stirred until it became homogeneous. The liner was then capped and placed within a Parr Steel autoclave reactor. The autoclave was then put in an oven heated at 170° C. for 6 days under static conditions. The solid products were recovered from the cooled reactor by centrifugation, washed with deionized water and dried at 95° C.

The resulting zeolite product was identified by powder XRD and SEM as a mixture of *MRE type framework molecular sieve and trace amount of amorphous phase.

Example 6

The as-synthesized molecular sieve product from Example 1 was calcined inside a muffle furnace under a flow of mixed nitrogen and air heated to 540° C. at a rate of 1° C./minute and held at 540° C. for 5 hours, cooled and then analyzed by powder XRD. The powder XRD data indicated that the material remains stable after calcination to remove the organic SDA. The calcined sample was subjected to a micropore volume analysis using argon as adsorbate and via the Density Function Theory method. The molecular sieve exhibited a micropore volume of 0.08 cm$^3$/g.

The invention claimed is:

1. A method of synthesizing a molecular sieve of *MRE framework type, the method comprising:
   (a) providing a reaction mixture essentially free of a non-zeolitic source of silicon oxide comprising:
      (1) a zeolite of FAU framework type;
      (2) a source of a Group 1 or Group 2 metal (M);
      (3) a source of hydroxide ions;
      (4) a structure directing agent (Q) comprising hexamethonium cations;
      (5) water; and
   (b) subjecting the reaction mixture to crystallization conditions sufficient to convert the zeolite of FAU framework type to a molecular sieve of *MRE framework type;
   wherein the reaction mixture is free of seeds.

2. The method of claim 1, wherein the reaction mixture has a composition, in terms of molar ratios, as follows:

| | |
|---|---|
| $SiO_2/Al_2O_3$ | 30 to 100 |
| $M/SiO_2$ | 0.05 to 0.50 |
| $Q/SiO_2$ | 0.01 to 0.20 |
| $OH/SiO_2$ | 0.10 to 0.30 |
| $H_2O/SiO_2$ | 10 to 60. |

3. The method of claim 1, wherein the reaction mixture has a composition, in terms of molar ratios, as follows:

| | |
|---|---|
| $SiO_2/Al_2O_3$ | 60 to 80 |
| $M/SiO_2$ | 0.05 to 0.20 |
| $Q/SiO_2$ | 0.01 to 0.10 |
| $OH/SiO_2$ | 0.12 to 0.20 |
| $H_2O/SiO_2$ | 15 to 40. |

4. The method of claim 1, wherein the zeolite of FAU framework type is a Y zeolite.

5. The method of claim 1, wherein the Group 1 or Group 2 metal (M) comprises potassium.

6. The method of claim 1, wherein the crystallization conditions include a temperature of from 125° C. to 200° C.

7. A molecular sieve of *MRE framework type having a molar ratio of $SiO_2/Al_2O_3$ in a range of 50 to 65, and in its as-synthesized form, comprising hexamethonium cations in its pores;
   the molecular sieve consisting of agglomerates of irregularly shaped crystals.

8. A process for dewaxing a paraffin-containing feedstock which comprises contacting the paraffin-containing feedstock at dewaxing conditions with a catalyst comprising an active form of the molecular sieve of claim 7.

9. The molecular sieve of claim 7, wherein the molar ratio of $SiO_2/Al_2O_3$ is in a range of 55 to 65.

* * * * *